United States Patent [19]

Kirsch

[11] 4,320,592
[45] Mar. 23, 1982

[54] FISHING DEVICE
[76] Inventor: John M. Kirsch, Stevens Point, Portage County, Wis.
[21] Appl. No.: 155,525
[22] Filed: Jun. 2, 1980
[51] Int. Cl.³ .............................................. A01K 91/00
[52] U.S. Cl. .................................. 43/43.13; 43/42.05; 43/42.39; 43/42.17; 43/42.19
[58] Field of Search ................. 43/43.13, 42.05, 42.36, 43/42.39, 42.17, 42.19

[56] References Cited

U.S. PATENT DOCUMENTS 3,218,750 11/1965 Lewin ................................ 43/42.39
3,535,813 10/1970 Cordell ............................... 43/42.05

FOREIGN PATENT DOCUMENTS 2409696 11/1977 France ................................ 43/42.39

Primary Examiner—James L. Jones, Jr.
Attorney, Agent, or Firm—Recka & Joannes

[57] ABSTRACT

A device for causing a trolled bait to dive and thereafter to move horizontally from side to side in a rhythmic and pulsing fashion, comprising a thin generally non-flexible planar shape having a weight or a plurality of weights mounted thereon, the center of mass of the weight being positioned radially outward from the center of mass of the non-flexible planar shape and a fishing line affixing device attached at a point on the device, on a line extending from the center of mass of the planar shape through the apparent center of mass of the weights, the preferred position being at a point two thirds of the way from the center of mass of the planar shape to the center of mass of the weight, and a release device operative to cause the device cease its side to side motion upon retrieval of the trolled bait or upon the baits being struck by a fish.

3 Claims, 9 Drawing Figures

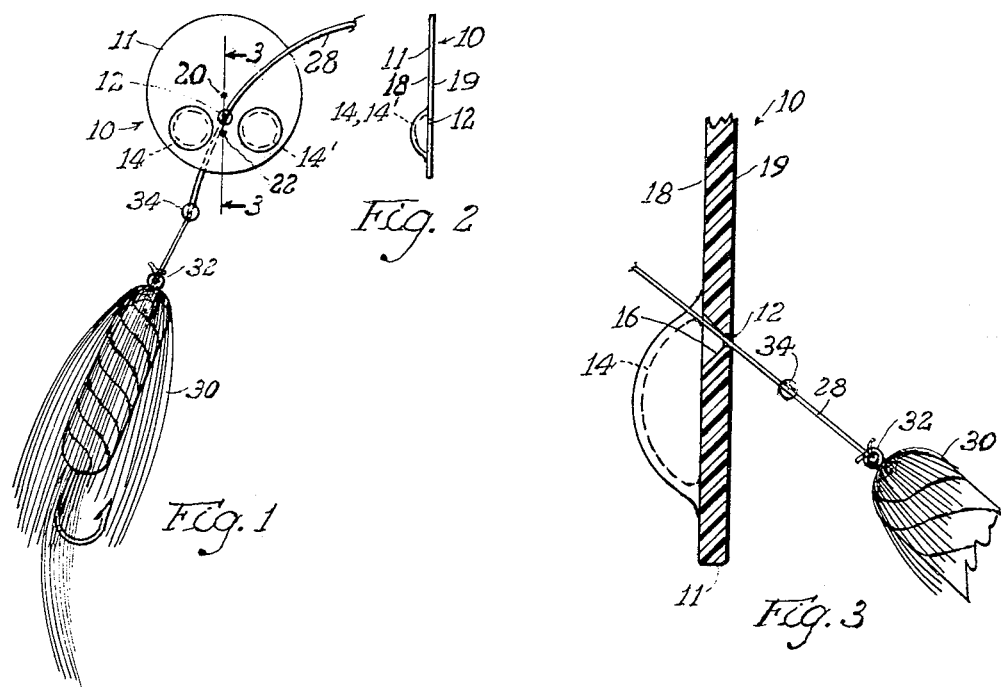
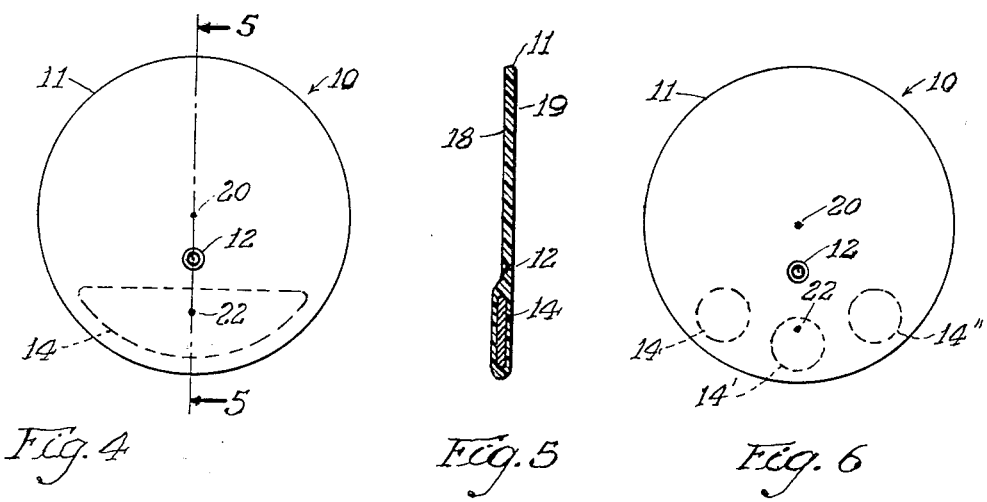

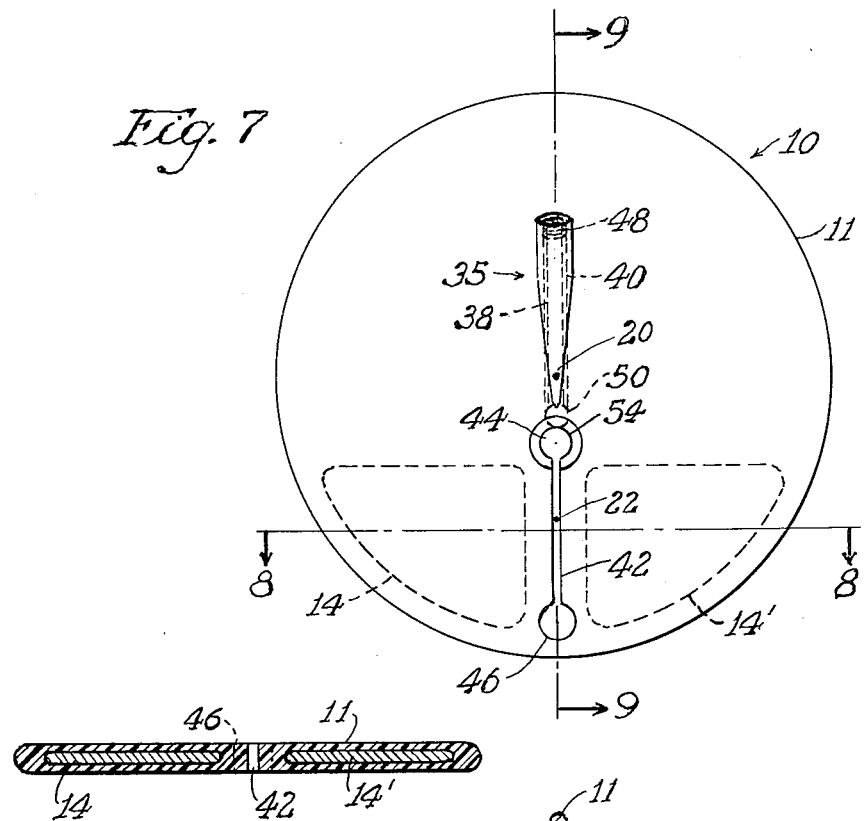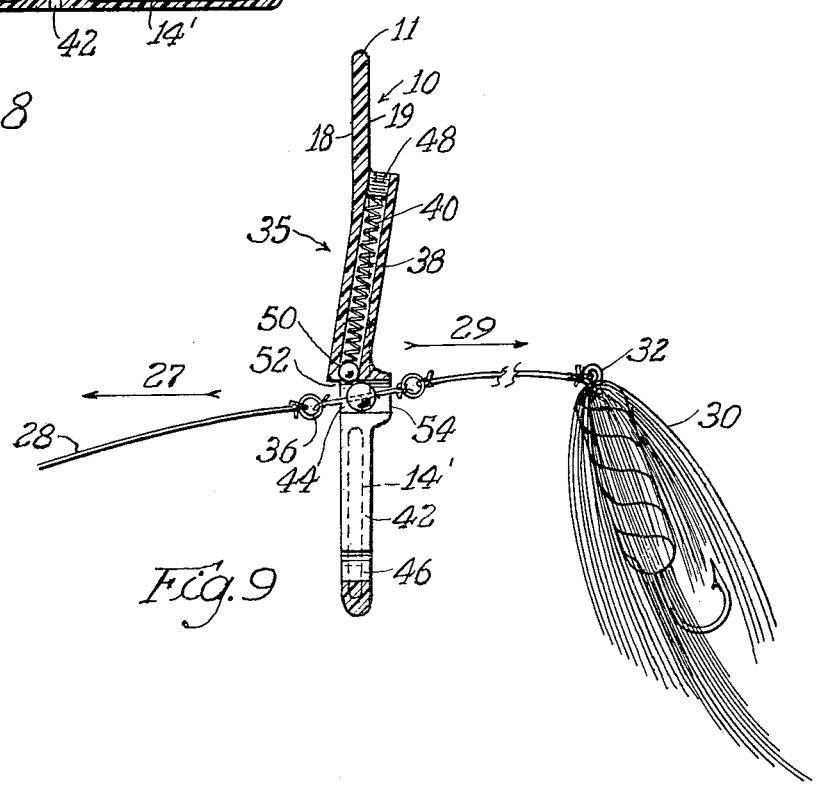

FISHING DEVICE

BACKGROUND OF THE INVENTION

This invention relates to fishing devices of the type that cause a trolled or retrieved bait to move out of a straight line of travel to dive and to simulate the erratic movement of a freely swimming bait.

The invention also relates to devices that cause a trolled bait to dive below the surface of the water to a depth inhabited by fish.

Prior art includes Jay U.S. Pat. No. 1,297,354 which uses a center mounted floppy deflector mounted in front of a trolled bait to cause the bait to take a random course through the water on trolling of the lure. Garvie U.S. Pat. No. 2,708,805 uses two center mounted floppy deflectors mounted in front of the trolled bait for the same purpose. Other deflector devices are shown in Aiken U.S. Pat. Nos. 1,495,832, Svalgaard 1,601,267 and Yarvice 1,934,158.

Planing devices that cause a trolled lure to dive below the surface of the water are shown in Collins U.S. Pat. Nos. 3,466,787 and Monchil 3,902,267.

Other devices such as spinners exist which are mounted other than at the center of the disc and combine a shiny surface to catch the attention of fish together with the ability to cause a trolled lure to move erratically through the water.

BRIEF SUMMARY OF THE INVENTION

The invention comprises a weighted essentially flat and essentially rigid deflector that because of the location of an added high specific gravity weight on the deflector and the point of location of the fishing line attachment causes the lure which it preceeds in the water, to dive and then to follow an oscillating path in a generally horizontal plane under the water. The device also causes the trolled lure to shift right and left along the path in which the lure is pulled.

The deflector in larger sizes has a release mechanism which causes the device to lie sidewise on the line when the trolled object is struck by a fish or when it is desired to retrieve the trolled lure.

It is an object of the invention to produce a device that combines the lure deflecting properties of a planar deflector and the diving properties of planing devices, without the spinning effect shown by other non-center mounted devices such as spinners.

BRIEF DESCRIPTION OF THE DRAWINGS

FIG. 1 is a view of one embodiment of the invention mounted on a fishing line upstream of a trolled lure showing two weights mounted on the surface of a flat disc.

FIG. 2 is a side view of the device of FIG. 1.

FIG. 3 is an expanded section view of the device in FIG. 1.

FIG. 4 is a view of another embodiment of the invention, this having a weight that is essentially triangular.

FIG. 5 is a section taken through FIG. 4 showing the weight encapsulated in the device.

FIG. 6 is a view of another embodiment of the invention, this with three weights arranged in a triangular configuration.

FIG. 7 is a view of another embodiment of the invention, this of larger size showing release mechanism and two weights.

FIG. 8 is a section through FIG. 7 showing positioning of weights within the larger embodiment.

FIG. 9 is a section through FIG. 7 showing one type of release mechanism.

DESCRIPTION OF THE PREFERRED EMBODIMENT

Referring to FIG. 1, the device comprises deflector 10, in this example a disc 11 of generally rigid material, weights 14 and 14' of substantially higher specific gravity than the material of the disc 11, mounted on such deflector 10, with a line attachment hole 12 drilled through such deflector 10, the weights 14 and 14' are located on the disc 11 so that the apparent center of mass of the weights 22 is other than at the center of mass of the disc 20; the line attachment hole 12 is beveled 16 as shown in FIG. 3.

In use, a fishing line 28 is passed through hole 12 through bevel 16, and a lure 30 is tied on to the end of the line 28 by knot 32. Preferably a bead 34 is inserted between the deflector 10 and the knot 32 to prevent the knot 32 from crowding into hole 12 which fouls the action of the deflector 10. The disc 11 has a proximate surface 18 and a distal surface 19; the proximate surface 18 faces in the direction that the lure is retrieved. The chamfer 16 is in the proximate surface 18.

The line attachment hole 12 through which the fishing line 28 is passed is located on an imaginary line passing through the center of mass of the disc 20 and the apparent center of mass of the weights 22.

As the lure 30 is trolled, the deflector 10 is forced back on the fishing line 28 until the distal surface 19 of the deflector 10 abuts the bead 34, at this point the lure dives to a fixed depth and moves thereafter in a regular side to side path in a horizontal plane.

Upon the striking of the lure 30 by a fish, the fishing line 28 is pulled through the deflector 10 causing the deflector 10 to lie on its side on the fishing line 28 greatly reducing the deflector 10 resistance to passing through the water.

The point of location of the line attachment hole 12 is along that imaginary line passing through the center of mass of the weight 22, [or through the apparent center of mass of a plurality of weights such as is shown in FIG. 6 and in FIG. 7] and the center of mass 20 of the disc 11 and is critical.

If the mounting hole 12 is at the center of mass 20 of the disc 11, no matter what the weight, the disc 11 simply rotates on the line. Location of the line attachment hole 12 at the center of mass of the weight 22 causes the deflector 10 to dive with little or no sideways motion. Regular oscillatory motion begins as the mounting point is moved along a line intersecting the two centers of mass, to a maximum and then decreases. At the optimum mounting point the attachment hole 12 is formed, and at this position the lure dives and moves from side to side to a maximum. As stated this sideways movement is at a maximum at a single point on the previously described line.

Further a triangular weight or a plurality of weights, as is shown in FIG. 6, of equal masses, located normal to the line passing through the center of masses 20 and 22 gives a greater range of horizontal motion. Deflector 10 with weights so mounted is less sensitive to variation in location of the line mounting hole 10 in terms of loss of maximum horizontal travel than is such a deflector with a single weight.

For example in a disc of rigid plastic, of two inch radius, optimum horizontal movement and diving occurred when the mounting hole was drilled 0.5 inches from the center of mass 30 the disc 11 and the center of mass 22 of a triangular lead weight of 16 grams located 1.33 inches from the center of the disc, along a line passing through the center of the disc, the mounting hole and the center of mass of the weight.

In smaller versions of the device, such as would be used for casting, no release mechanism is needed to stop the side to side reciprocal movement. In larger versions of the device it is desireable to eliminate the drag of the deflector 10 upon the strike of a fish or so that the line 28 and lure 30 can be more easily retrieved.

FIG. 7 shows a larger version of the deflector 10 with a release mechanism 35, such mechanism comprises bearing swivel 36, release slot 42 and bearing swivel release passage 54. The bearing swivel 36 is held in the line attachment hole 12 by the force of water pushing it back and by pressure bearing 50. Force is applied to pressure bearing 50 by spring 40 which is carried in spring duct 38; the pressure bearing 50 is retained in the duct 38 by pressure bearing retaining lip 52 and by force from spring 40. Force on the pressure bearing 50 is varied by moving set screw 48 in or out. This varies the force necessary to release the deflector and to eliminate its drag.

Upon the lure being struck by a fish, the swivel 36 is pulled out of bearing swivel release passage 54, the fishing line 28 passing through release slot 42 to the outer edge of the deflector 10. This causes the deflector 10 to lie on its side on the line 28 and stops further side to side travel and greatly lessens the drag of the deflector 10.

To retrieve the device 10, a sharp tug is made on the fishing line 28 which causes bearing swivel 36 to force pressure bearing 50 up into the duct 38 allowing swivel 36 to pull out and releases the mechanism as above.

I claim:
1. In a fishing device:
    a generally flat rigid deflector;
    at least one weight fixed on the deflector in such a fashion that the center of mass of such weight is displaced from the center of mass of such deflector;
    line attachment means located on such deflector at a point on a line extending from the center of mass of said deflector to the center of mass of said weight.
2. The device as shown in claim 1 wherein such line attachment means is located at a point displaced radially outward from the center of mass of the disc.
3. In a fishing device:
    a generally flat rigid disc;
    at least one weight of a substantially greater specific gravity than the material which the disc is constructed mounted on such disc other than at the center of mass of the disc;
    line attachment means, mounted at a point on a line passing through the center of mass of the disc and the center of mass of the weight, between such centers of mass, other than at the exact center of masses of the weight and the disc.

* * * * *